United States Patent [19]

Lode

[11] Patent Number: 4,570,189

[45] Date of Patent: Feb. 11, 1986

[54] HIGH DENSITY DIGITAL DATA RECORDING SYSTEM

[76] Inventor: Tenny D. Lode, 59 W. 4th St., #21D, St. Paul, Minn. 55102

[21] Appl. No.: 83,252

[22] Filed: Oct. 10, 1979

[51] Int. Cl.⁴ .......................... G11B 5/09; G11B 21/02
[52] U.S. Cl. ....................................... 360/50; 360/74.1
[58] Field of Search ................... 360/50, 52, 74.1, 74.2

[56] References Cited

U.S. PATENT DOCUMENTS

| | | | |
|---|---|---|---|
| 3,732,380 | 5/1973 | Kimbell | 360/30 |
| 3,898,691 | 8/1975 | Nakauchi et al. | 360/52 |
| 4,157,571 | 6/1979 | Shu | 360/74.1 |

Primary Examiner—Vincent P. Canney
Attorney, Agent, or Firm—Kinney & Lange

[57] ABSTRACT

This invention relates to the recording and reproducing of digital data on magnetic tape and, more particularly, to increasing the effective data recording density via reducing the lengths of the interblock gaps. The tape is stopped and started with moderate accelerations, in distances which are generally greater than the interblock gap length. In a particular form of the invention, when the tape is to be stopped at the end of a data block, it is stopped in a distance greater than the gap length, reversed and brought to rest with the record/reproduce head on the interblock gap. When the tape is to be started, it is first reversed for a short distance, and then driven in the desired direction such that it is up to normal operating speed at the end of the interblock gap. The interblock gap length may be substantially shorter than the distance required to stop and start the tape. The effective data recording density is increased through this interblock gap length reduction.

5 Claims, 5 Drawing Figures

HIGH DENSITY DIGITAL DATA RECORDING SYSTEM

BACKGROUND OF THE INVENTION

In magnetic tape digital data recording systems, the general practice is to record the data in blocks which are separated by empty interblock gaps. The data blocks are recorded or reproduced at a substantially constant tape speed. The gaps provide the space and time for stopping the tape when the system is not actively recording or reproducing data, and for subsequently starting the tape and bringing it up to normal operating speed before recording or reproducing the next data block.

The required interblock gap length depends on the performance level of the transport, the tape operating speed and, sometimes, industry, national or international standards. High tape speeds and/or less sophisticated transports require longer gaps. Shorter gaps require lower operating tape speeds and/or higher performance transports. The general range of interblock gaps is from about 0.5" to several inches, with about 1.5" being a common value.

The feasible data recording densities have increased from a few hundred bpi (bits per inch) a few decades ago to 6400 bpi and higher now. However, when the tape space which is lost to the interblock gaps is considered, the effective data recording density has generally not increased nearly as much as the block recording density.

For example, consider the recording of data in bit serial form in 4096 bit blocks. If the block recording density is 6400 bpi, the data block length will be 4096/6400=0.64". However, if the interblock gap length is 1.5", the effective total block length will be 2.14". The effective recording density is then only 4096/2.14=1914 bpi, less than a third of the 6400 bpi block density. It is this 1914 bpi effective recording density, not the 6400 bpi block density, that determines how much data can be recorded on a reel or cartridge of tape.

The effective recording density, $D_{eff}$, in bpi, is given by:

$$D_{eff} = \frac{\text{\# bits per block}}{\text{total block length}} = \frac{B}{B/D + G}$$

where: B=the data block length in bits;
D=the data block recording density in bpi; and
G=the interblock gap length in inches.

Values of $D_{eff}$ for various values of B, D and G are listed in Table 1. As may be seen from Table 1, short block lengths and long gap lengths give low effective recording densities, regardless of the block recording densities. As would be expected, the relative loss of recording density is greater for higher block recording densities. To obtain the benefits of a high block recording density, in the form of a high effective recording density, it is necessary to use long data block lengths and/or short interblock gaps.

The use of long data blocks can have a number of cost and/or performance disadvantages. It is generally necessary that the recording/reproducing system have a buffer memory which is large enough to store one or more complete data blocks. This may be a significant cost. In some applications, the buffer memory functions may be provided by the memory of an associated computer. However, in such instances, the computer must devote a significant amount of memory to the recording/reproducing task whenever it is being performed. Further, since the tape system is then not an independent unit, but must make substantial use of the computer for its basic operation, system integration may be more difficult and may require individual engineering and/or programming for the specific computer system. If a computer memory is used for the recorder buffer memory, recorder processes such as redundant encoding, error detection and error correction may become computer system tasks, rather than being performed within an independent recorder.

There are also performance disadvantages to the use of long data blocks. With fixed length blocks and variable length files, longer blocks may increase the probable waste of recording space by the incomplete filling of a block. The longer the data block, the more likely it is that there will be an error in reading the block. If there is a read error, and the system re-reads a data block, it will require more time to re-read a longer block.

| D, Data Block Recording Density in bpi | B, Data Block Length in Bits | Data Block Length in Inches | $E_{ff}$, Effective Recording Density, in bpi, for Specified Interblock Gap Length, G | | | |
|---|---|---|---|---|---|---|
| | | | 1.5" | .5" | .25" | .1" |
| '200 | 256 | 1.28 | 92 | 144 | 167 | 186 |
| | 1,024 | 5.12 | 155 | 182 | 191 | 196 |
| | 4,096 | 20.48 | 186 | 195 | 198 | 199 |
| | 16,384 | 81.92 | 196 | 199 | 199 | 200 |
| 800 | 256 | .32 | 141 | 312 | 449 | 610 |
| | 1,024 | 1.28 | 368 | 575 | 669 | 742 |
| | 4,096 | 5.12 | 619 | 729 | 763 | 785 |
| | 16,384 | 20.48 | 745 | 781 | 790 | 796 |
| 1600 | 256 | .16 | 154 | 388 | 624 | 985 |
| | 1,024 | .64 | 479 | 898 | 1,151 | 1,384 |
| | 4,096 | 2.56 | 1,009 | 1,339 | 1,458 | 1,540 |
| | 16,384 | 10.24 | 1,396 | 1,526 | 1,562 | 1,585 |
| 6400 | 256 | .04 | 166 | 474 | 883 | 1,829 |
| | 1,024 | .16 | 617 | 1,552 | 2,498 | 3,938 |
| | 4,096 | .64 | 1,914 | 3,593 | 4,602 | 5,535 |
| | 16,384 | 2.56 | 4,035 | 5,354 | 5,831 | 6,159 |

A second approach to increasing the effective data recording density is to reduce the interblock gap length. A problem with a short gap is that it requires high accelerations to stop the tape within a short gap, and to start the tape and bring it up to normal operating speed within a short gap. High tape accelerations generally require more expensive transport mechanisms, and may increase tape wear and the likelihood of tape damage.

If we consider the stopping of the tape within a gap, and assume that the tape deceleration is constant until the tape stops, the acceleration is given by:

Acceleration (in/sec$^2$)=$V^2/2S$ or:

Acceleration (grav.)=$V^2/2Sg$ where:
S=the stopping distance in inches;
V=the tape speed in in/sec; and
g=the acceleration of gravity, 385.8 in/sec$^2$.

The same magnitude of acceleration is required to start the tape and bring it up to a normal operating speed, V, within a distance, S.

Table 2 lists calculated tape acceleration values for various values of V, the tape velocity; S, the tape stopping distance and G, the interblock gap length. The stopping distance, S, is assumed to be one-third of the interblock gap length. As may be seen, short interblock gaps imply high tape accelerations.

The general problem is that high data block recording densities do not necessarily give correspondingly high effective recording densities. In order to achieve high effective recording densities, it is generally necessary to use long data blocks and/or short interblock gaps. In a general purpose magnetic tape digital data recording system, it is desirable to avoid a requirement of long blocks. Short interblock gaps, with reasonable tape speeds, imply high tape stopping and starting accelerations. Reducing the tape speed is generally an undesirable solution as it reduces the recording/reproducing data transfer rate. In a typical system, the feasible tape acceleration sets a lower limit on the interblock gap length and, thus, limits the effective recording density.

| | Tape Acceleration in in/sec$^2$ for Specified Interblock Gap, G, and Stopping Distance, S | | | |
|---|---|---|---|---|
| Tape Speed V in in/sec | G = 1.5" S = .5" | G = .5" S = .167" | G = .25" S = .0833" | G = .1" S = .0333" |
| 7.5 | 56 | 168 | 338 | 845 |
| 30 | 900 | 2,695 | 5,402 | 13,514 |
| 75 | 5,625 | 16,841 | 33,764 | 84,459 |

Table 2, tape acceleration in in/sec$^2$ required to stop or start the tape in a conventional tape transport system, as a function of:
V, the tape speed in in/sec; and
S, the tape stopping or starting distance in inches.
The stopping distance, S, is assumed to be one-third of the interblock gap length, G.

SUMMARY OF THE INVENTION

In the present invention, the problem of short interblock gaps requiring high tape stopping and starting accelerations is avoided by not requiring that the tape be stopped or started in distances which are fractions of the interblock gap length. The tape is stopped and started with moderate accelerations, in distances which may be appreciably greater than the interblock gap length.

In a particular form of the invention, a digital shaft position sensor is mechanically connected to the tape drive capstan of a magnetic tape transport. With suitable control circuits, the shaft position sensor is used to control primarily the speed or the position of the capstan, depending on the selected control mode. To stop the tape after the recording or reproducing of a data block, the capstan position at, or shortly after, the end of the data block is sensed. The tape is decelerated and stopped in a distance which may be greater than the interblock gap length, and then reversed and stopped at the previously sensed position, within the interblock gap. To start the tape, it is first moved backwards for a short distance, and then accelerated and brought up to speed to record or reproduce the following data block. The beginning point of the following data block may be determined by reading the end of the previous data block and/or by measuring the capstan position via the shaft position sensor. The result is that the interblock gap may be substantially shorter than the distance required to stop and start the tape. The effective data recording density is increased through this reduction in interblock gap length.

DESCRIPTION OF THE PREFERRED EMBODIMENTS

Figure 1:
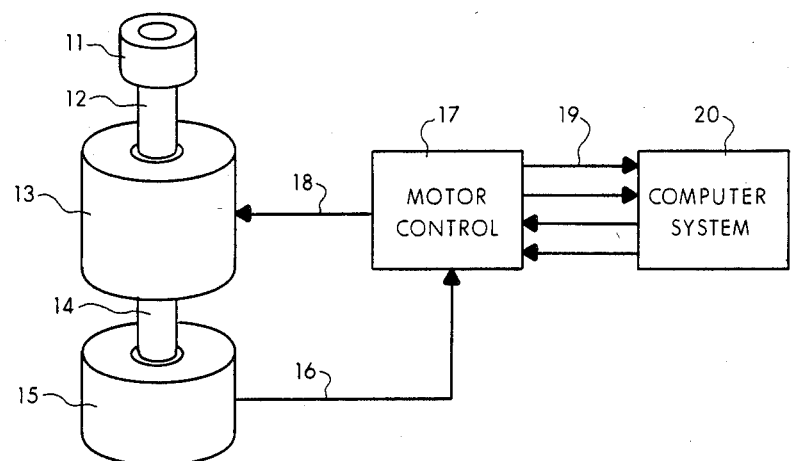
FIG. 1 is an illustration of a first form of the invention including a digital shaft position sensor for the control of the tape motion for the stopping and starting of the tape with moderate accelerations and with a small interblock gap.

FIG. 1 is an illustration of a first form of the invention including a digital shaft position sensor for the control of the tape motion for the stopping and starting of the tape with moderate accelerations and with a small interblock gap. In FIG. 1, tape drive capstan wheel 11 is mechanically connected via shaft 12 to drive motor 13, which is mechanically connected via shaft 14 to digital shaft position sensor 15. Shaft position sensor 15 is connected via line 16 to motor control 17, which is connected via line 18 to motor 13. Motor control 17 is connected via lines 19 to computer system 20.

The elements shown in FIG. 1 are incorporated in an otherwise conventional magnetic tape digital data recording system for the recording and reproducing of digital data under the control of computer system 20. Drive wheel 11 drives the magnetic tape 9 relative to a conventional recording/reproducing head 10 in a conventional manner. Drive motor 13 drives wheel 11 at a speed and in a direction as controlled by motor control 17. Shaft position sensor 15 is mechanically connected to motor 13 and drive wheel 11 so that it senses the angular position and velocity of drive wheel 11. The combination of motor control 17, line 18, motor 13, shaft 14, shaft position sensor 15 and line 16 forms a closed loop control system which controls the angular position and velocity of drive wheel 11 and, hence, the tape 9. Lines 16 and 18 represent functional connections and are not necessarily single lines. Lines 19 represent functional connections between motor control 17 and computer system 20, and in particular systems may be more or less than the four lines shown.

Figure 2:
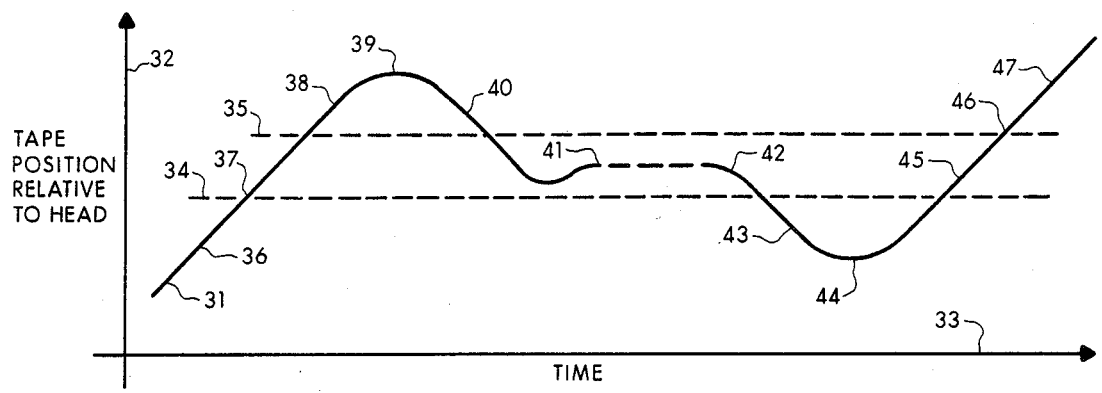
FIG. 2 is a diagrammatic illustration of the tape motion for the stopping and subsequent starting of the tape with the tape rest point within a small interblock gap.
Figure 3:
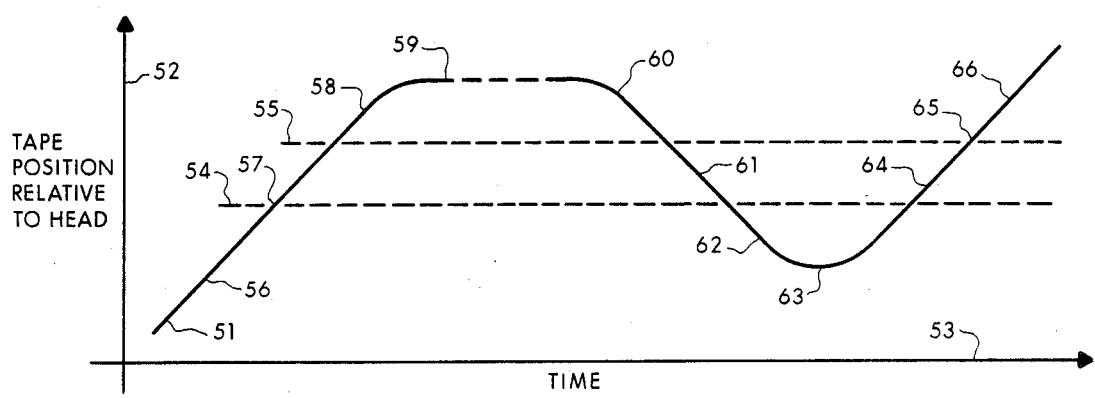
FIG. 3 is a diagrammatic illustration of the tape motion for the stopping and subsequent starting of the tape with the tape rest point beyond a small interblock gap.
Figure 4:
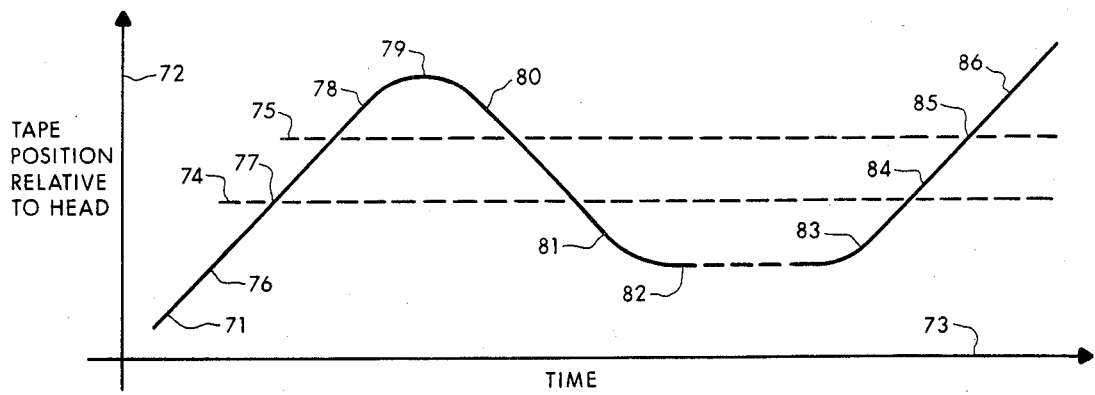
FIG. 4 is a diagrammatic illustration of the tape motion for the stopping and subsequent starting of the tape with the tape rest point before a small interblock gap.

Three of the possible modes of operation of the system of FIG. 1 are shown in FIGS. 2, 3 and 4.

FIG. 2 is a diagrammatic illustration of the tape motion for the stopping and subsequent starting of the tape with the tape rest point within a small interblock gap. FIG. 2 includes plot line 31, tape position scale 32 and time scale 33. Dashed line 34 represents the end of a data block indicated on the tape 9 by a suitable signal received or sensed by head 10 and the beginning of an interblock gap. Dashed line 35 represents the end of the interblock gap and the beginning of the following data block which also is indicated by a suitable signal sensed by head 10. Points 36, 37, 38, 39, 40, 41, 42, 43, 44, 45, 46 and 47 are particular points on plot line 31 which will be referred to in the following description. It is common for the position of the tape relative to the head to be known and controlled by discrete signals on the tape or by merely using the information from the shaft position sensor 15 to determine when the head is aligned with a data block or has reached the end of a data block. It is conventional to correlate in a computer system the signals from the tape with the shaft position sensors so that the controls can move the tape a desired amount from one of the positions indicated by a signal on the tape.

FIG. 2 is a plot showing the operation of the system of FIG. 1 in the reading of a data block, the stopping of the tape within a short interblock gap, the subsequent starting of the tape and the reading of a following data block. The interblock gap is indicated by dashed lines 34 and 35. The length of the interblock gap corresponds to the vertical distance between dashed lines 34 and 35. Tape position scale 32 indicates the position of the magnetic tape 9 relative to the record/reproduce head 10. A plot point below dashed line 34 indicates that a section of the tape 9 preceding the particular interblock gap is in contact with the head 10. A plot point between dashed lines 34 and 35 indicates that the particular interblock gap is in contact with the head, and a plot point above dashed line 35 indicates that a section of the tape beyond the particular interblock gap is in contact with the head. At point 36, the system is reading a data block, and reaches the end of the data block at point 37. At that point, the position of drive wheel 11 is measured (and indicated) by shaft position sensor 15 and motor control 17. The tape is then slowed with a moderate acceleration, and continues past the interblock gap through point 38 to point 39, where the tape motion is stopped and reversed. The tape continues to move in a reverse direction past point 40 as indicated by shaft position sensor 15, and is brought to rest at point 41 with the interblock gap resting on the tape head. Point 41 is a short predetermined distance beyond point 37, as measured by shaft position sensor 15.

Subsequently, when the system is to read the following data block, the tape is first accelerated in a reverse direction at point 42, moves past point 43 within the preceding data block, is stopped at point 44, and then moved in a forward direction such that the forward tape speed is stabilized at or before point 45. The system then begins reading the following data block which begins at point 46, and continues reading through point 47 and beyond. The points 42, 43, 44 and 45 are all determined by shaft position sensor 15.

Thus, the general operation of the system in the mode shown in FIG. 2 is that the tape is stopped after the end of a data block with a moderate acceleration such that the tape may continue past the interblock gap. The tape motion is then reversed, and the tape is brought to rest with the interblock gap in contact with the head. To subsequently read the following data block, the tape is first reversed for a short distance, and then moved forward and brought up to speed before the following data block passes over head. It is not necessary to stop the tape, or start it and bring it up to normal operating speed, within the interblock gap. Thus, the interblock gaps may be made short to achieve high effective data recording densities, without requiring the high tape accelerations that would be necessary if short interblock gaps were used with conventional systems.

FIG. 3 is a diagrammatic illustration of the tape motion for the stopping and subsequent starting of the tape with the tape rest point beyond a small interblock gap. FIG. 3 includes plot line 51, tape position scale 52 and time scale 53. Dashed line 54 represents the end of a data block and the beginning of an interblock gap. Dashed line 55 represents the end of the interblock gap and the beginning of the following data block. Points 56, 57, 58, 59, 60, 61, 62, 63, 64, 65 and 66 are particular points on plot line 51 which will be referred to in the following description.

FIG. 3 is generally similar to FIG. 2, except for illustrating a mode of operation in which the tape is stopped with a moderate acceleration past the interblock gap. At point 56, the system is reading a data block and reaches the end of the data block at point 57. The tape is then slowed with a moderate acceleration, and it continues past the interblock gap through point 58 to point 59, where the tape is brought to rest with the following data block on the tape head. Subsequently, when the system is to read the following data block, the tape is first accelerated in a reverse direction at point 60, moves past point 61 within the interblock gap, past point 62 within the preceding data block and is stopped momentarily at point 63. The tape is then moved in a forward direction such that the forward tape speed stabilizes at point 64. The system then begins reading the following data block which begins at point 65, and continues reading past point 66 and beyond.

Thus, the general operation of the system in the mode shown in FIG. 3 is that the tape is stopped after the end of a data block with a moderate acceleration such that the tape motion continues past the interblock gap. The tape is brought to rest with the following data block in contact with the head 10. To subsequently read the following data block, the tape 9 is first backed up for a short distance, then moved forward and brought up to speed before the following data block passes over the head 10. As in the mode shown in FIG. 2, it is not necessary to stop the tape, or start it and bring it up to normal operating speed, within the interblock gap. As before, the interblock gaps may be made short to achieve high effective data recording densities, without requiring the high tape accelerations that would be necessary if short interblock gaps were used with a conventional system.

FIG. 4 is a diagrammatic illustration of the tape motion for the stopping and subsequent starting of the tape with the tape rest point before a small interblock gap. FIG. 4 includes plot line 71, tape position scale 72 and time scale 73. Dashed line 74 represents the end of a data block as indicated by the shaft position sensor 15 or by a separate signal on tape 9, and the beginning of an interblock gap. Dashed line 75 represents the end of the interblock gap and the beginning of the following data block. Points 76, 77, 78, 79, 80, 81, 82, 83, 84, 85 and 86 are particular points on plot line 71 which will be referred to in the following description.

FIG. 4 is generally similar to FIGS. 2 and 3, except for illustrating a mode of operation in which the tape 9 is stopped with a moderate acceleration and then reversed and brought to rest with the previously read data block on the head 10. At point 76 the system is reading a data block and reaches the end of the data block at point 77. The tape 9 is then slowed with a moderate acceleration and continues past the interblock gap through point 78 to point 79 where the tape motion is stopped and reversed. The tape motion continues in a reverse direction past point 80, through the interblock gap and past point 81 within the previously read data block and is brought to rest at point 81 with the previously read data block resting on the head 10. Point 82 is a short predetermined distance before point 77 as measured by shaft position sensor 15. Subsequently, when the system is to read the following data block, the tape is accelerated in a forward direction at point 83 such that the forward tape speed stabilizes at point 84. The system then beings reading the following data block which begins at point 85, and continues reading past point 86 and beyond.

Thus, the general operation of the system in the mode shown in FIG. 4 is that the tape is stopped after the end of a data block with a moderate acceleration such that the tape may continue past the interblock gap. The tape motion is then reversed and the tape is brought to rest with the previously read data block in contact with the head. To subsequently read the following data block, the tape is accelerated in a forward direction and brought up to normal operating speed before the following data block passes over the head. As in the modes shown in FIGS. 2 and 3, it is not necessary to stop the tape, or bring it up to normal operating speed, within the interblock gap. As before, the interblock gaps may be made short to achieve high effective data recording densities, without requiring the high tape accelerations that would be necessary if short interblock gaps were used with a conventional system.

Figure 5:
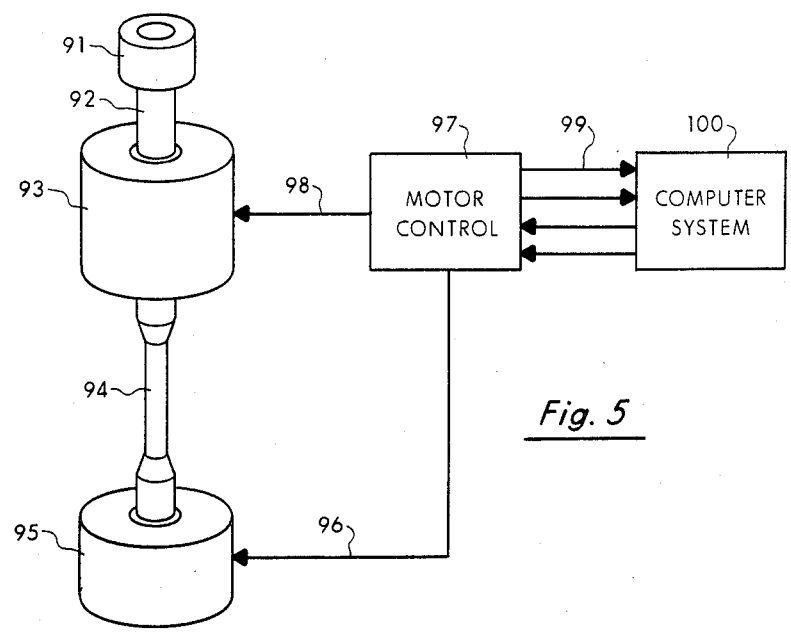
FIG. 5 is an illustration of a second form of the invention including a brake and compliant shaft for the stopping and starting of the tape with moderate accelerations and with a small interblock gap.

FIG. 5 is an illustration of a second form of the invention including a brake and compliant shaft for the stopping and starting of the tape with moderate accelerations and with a small interblock gap. In FIG. 5, tape drive capstan wheel 91 is mechanically connected via shaft 92 to drive motor 93, which is mechanically connected via compliant shaft 94 to brake 95. Brake 95 is connected via line 96 to motor control 97. Motor control 97 is connected via line 98 to motor 93, and via lines 99 to computer system 100.

The system of FIG. 5 and its operation are generally similar to the system of FIG. 1 and its operation as illustrated in FIG. 2. When the system of FIG. 5 is reading a tape 89 with a head 90 and it is desired to stop at the end of a data block. The shaft position sensor 95 may supply the end of block signal, or a separate signal on tape 89, as read by the head 90, may be used. Then drive motor 93 is de-energized and brake 95 is energized when the tape is about at the desired stopping point. Brake 95 holds the brake end of compliant shaft 94 at a fixed position. Drive wheel 91 continues for a short distance, as compliant shaft 94 twists. Tape drive wheel 91 slows down, stops, reverses and returns to its position at the time that brake 95 was energized. Because of the compliant nature of compliant shaft 94, there are no sudden or large forces on brake 95, tape drive wheel 91 or the tape 89. The tape 89 is brought gently to a stop at the desired stopping point in a manner generally similar to that shown in FIG. 2.

A moderate acceleration tape start using the system of FIG. 5 may be accomplished by backing up the tape for a short distance, energizing the drive motor for forward tape motion, sensing the interblock gap via the read head 90, and then reading the following data block in a manner generally similar to that shown in FIG. 2.

The preceding disclosure has shown particular forms and modes of operation of the subject invention. Other forms and modes of operation may be devised to meet particular requirements within the spirit of the invention.

The preceding disclosure description has been in terms of the operation of the system as a reproducing system, for the reproducing of previously recorded data, as it was convenient to refer to data blocks and interblock gaps as already existing on the tape. The system may be used in a similar manner for the recording of data, data blocks and interblock gaps on tape. The invention may be used with single-track recording, multi-track recording and with such recording forms and formats as may be appropriate for the application. The invention may be used with reel-to-reel tapes, cartridge or cassette-type tapes, endless loop-type tapes, or such other types of media as may be appropriate for the application.

FIG. 1 illustrates the use of a shaft position sensor for the sensing and control of the position of a tape drive wheel and the tape. The tape position may also be sensed by using a read head to sense the beginnings and/or ends of previously written data blocks, interblock gaps or other recorded data. Either or both of these techniques and/or other position measurement means may be used to sense and control the tape position within the spirit of this invention.

The preceding description has been in terms of the reading or writing of a data block, bringing the tape to rest and then reading or writing a following data block. This mode of operation is one in which the subject invention is particularly applicable. However, as in the case of more conventional digital data recording systems, systems incorporating the subject invention may also be directed by a controlling computer to read or write several data blocks without stopping, to search some distance for a particular data block or location, or to advance or rewind the tape to an end.

I claim:

1. In a digital data recording system in which data is recorded on an elongated movable medium in the form of discrete data blocks on a length of the elongated movable medium separate by interblock gaps between the end of one data block and the beginning of a second data block, head means to sense data and signals from the elongated medium, means for driving said elongated medium at an operating speed, said means for driving requiring a first acceleration time to reach the normal operating speed after being started and a second acceleration time to reach a stopped position after being shut off, said acceleration times requiring movement of said elongated medium for first and second acceleration distances, respectively, control means including means for stopping said means for driving and thus said elongated medium subsequent to the end of a selected data block, said elongated medium thereafter traveling said second acceleration distance, means for moving said means for driving and said elongated medium in a reverse direction a selected distance known to be sufficient to insure that the means to sense is spaced from the beginning of the next subsequent data block a distance at least equal to said first acceleration distance to permit the means for driving and said elongated medium to reach the normal operating speed before the head means to sense reaches the beginning of said next data block when the next data block is to be sensed.

2. The combination of claim 1 further characterized by said medium being a magnetic tape.

3. In a digital data recording system in which data is recorded on an elongated movable medium in the form of discrete data blocks having digital information thereon ready by a sensing head and separated by interblock gaps, the method of reducing the interblock gap length required because of the need to provide first and second acceleration lengths of travel of the medium subsequent to reaching the end of a data block and prior to reaching the beginning of the next subsequent data block to insure that the sensing head reads the data on the elongated medium with the medium at its normal operating speed, including the steps of stopping said medium after the end of a first data block at a point where the sensing head is beyond the range in which the medium can be accelerated and brought up to operating speed before reaching the beginning of the following data block, positively driving said medium in a reverse direction a selected distance from the beginning of the next data block known to be at least equal to the distance necessary for acceleration of the medium from rest to nominal operating speed, stopping said medium after such reverse movement, and accelerating said medium in a forward direction to bring the medium up to operating speed before the beginning of the next data block and thereby providing interblock gap lengths on the medium less than the length of the medium required for stopping the medium after the end of the data block and for accelerating the medium to operating speed from a stopping position.

4. The method of claim 3 further characterized by said medium being a magnetic tape.

5. The method of claim 4 further characterized by including the step of bringing said medium to rest within said interblock gap, after a reverse motion, for a period of time before the reading of said following data block.

* * * * *